US012810505B2

(12) United States Patent
Udvuleanu et al.

(10) Patent No.: US 12,810,505 B2
(45) Date of Patent: Nov. 24, 2026

(54) GRAPHIC TEMPLATE CUSTOMIZATION USING SIMPLE TEXT PROMPTS

(71) Applicant: ADOBE INC., San Jose, CA (US)

(72) Inventors: Mihai Udvuleanu, Bucharest District (RO); Andrei-Adrian Dinu, Căţelu (RO); Marian Lupaşcu, Bucharest District (RO); Ionuţ Mironică, Bucharest District (RO)

(73) Assignee: ADOBE INC., San Jose, CA (US)

( * ) Notice: Subject to any disclaimer, the term of this patent is extended or adjusted under 35 U.S.C. 154(b) by 89 days.

(21) Appl. No.: 18/825,419

(22) Filed: Sep. 5, 2024

(65) Prior Publication Data

US 2026/0065548 A1 Mar. 5, 2026

(51) Int. Cl.
*G06T 11/60* (2026.01)
*G06F 40/109* (2020.01)

(52) U.S. Cl.
CPC ............ *G06T 11/60* (2013.01); *G06F 40/109* (2020.01)

(58) Field of Classification Search
CPC ............................ G06F 3/04845; G06F 3/0482
See application file for complete search history.

(56) References Cited

U.S. PATENT DOCUMENTS

| | | | | |
|---|---|---|---|---|
| 10,181,184 | B2 * | 1/2019 | Li | G06T 5/70 |
| 10,210,179 | B2 * | 2/2019 | Van Zwol | G06V 10/40 |
| 2025/0322557 | A1 * | 10/2025 | Hurlburt | G06T 11/00 |
| 2025/0371324 | A1 * | 12/2025 | Boyd | G06N 3/0475 |
| 2025/0381952 | A1 * | 12/2025 | Klaus | B60W 30/09 |
| 2026/0024237 | A1 * | 1/2026 | Zhang | G06T 11/00 |

OTHER PUBLICATIONS

1Shi, et al., "De-Stijl: Facilitating Graphics Design with Interactive 2D Color Palette Recommendation", In Proceedings of the 2023 CHI Conference on Human Factors in Computing Systems, Apr. 2023, 19 pages.
2Hegemann, et al., "CoColor: Interactive Exploration of Color Designs", In Proceedings of the 28th International Conference on Intelligent User Interfaces, Mar. 2023, pp. 106-127.
3Li, et al., "Blip-2: Bootstrapping Language-Image Pre-Training with Frozen Image Encoders and Large Language Models", arXiv preprint arXiv:2301.12597, 2023, pp. 1-13.
4Li, et al., "Prefix-Tuning: Optimizing Continuous Prompts for Generation", arXiv preprint arXiv:2101.00190 [cs.CL] Jan. 1, 2021, 15 pages.
5Radford, et al., "Learning Transferable Visual Models from Natural Language Supervision", In International Conference on Machine Learning, 2021, 16 pages.

* cited by examiner

*Primary Examiner* — Van N Chow
(74) *Attorney, Agent, or Firm* — F. CHAU & ASSOCIATES, LLC

(57) ABSTRACT

A computer-implemented method comprises receiving an input graphic design document and an input prompt, where the input graphic design document includes an image element, and wherein the input prompt indicates a target theme different from a theme of the input graphic design document. An image generation model generates a synthetic image based on the input prompt, wherein the synthetic image has the target theme, and a custom graphic design document is generated based on the input graphic design document and the synthetic image, wherein the custom graphic design document has the target theme and includes the synthetic image at a location of the image element of the input graphic design document.

20 Claims, 8 Drawing Sheets

GRAPHIC TEMPLATE CUSTOMIZATION USING SIMPLE TEXT PROMPTS

BACKGROUND

The following relates generally to image processing, and more specifically to generating custom graphic design documents using machine learning. Generating graphic design documents involves creating or selecting individual visual elements and the overall style of a document to align with a specific theme or aesthetic. Traditional methods for generating graphic design documents involve manually selecting and placing individual elements, such as images, icons, colors, and fonts. These methods can be time-consuming and require specialized design skills.

SUMMARY

A method, apparatus, and non-transitory computer readable medium for image processing are described. One or more aspects of the method, apparatus, and non-transitory computer readable medium include receiving an input graphic design document and an input prompt, wherein the input graphic design document includes an image element, and wherein the input prompt indicates a target theme different from a theme of the input graphic design document; generating, using an image generation model, a synthetic image based on the input prompt, wherein the synthetic image has the target theme; and generating a custom graphic design document based on the input graphic design document and the synthetic image, wherein the custom graphic design document has the target theme and includes the synthetic image at a location of the image element of the input graphic design document.

A method, apparatus, and non-transitory computer readable medium for image processing are described. One or more aspects of the method, apparatus, and non-transitory computer readable medium include receiving, by the computing device, an input graphic design document and an input prompt, wherein the input graphic design document includes an image element, and wherein the input prompt indicates a target theme; generating, using an image generation model comprising parameters stored in the at least one memory, a synthetic image based on the input prompt; generating, by a palette generation model comprising parameters stored in the at least one memory, a color palette based on the input prompt; and generating, by the computing device, a custom graphic design document having the target theme, wherein the custom graphic design document includes the synthetic image at a location of the image element and a color from the color palette.

An apparatus and method for image processing are described. One or more aspects of the apparatus and method include at least one processor; at least one memory storing instruction executable by the at least one processor; an image generation model comprising parameters stored in the least one memory and trained to generate a synthetic image based on an input prompt, wherein the input prompt indicates a target theme; and a document generation component configured to generate a custom graphic design document based on the synthetic image and an input graphic design document, wherein the custom graphic design document has the target theme and includes the synthetic image at a location of the image element of the input graphic design document.

DETAILED DESCRIPTION

The following relates generally to image processing, and more specifically to customizing graphic design documents using machine learning. In some examples, generating a graphic design document involves modifying the visual elements and overall style of a template document to align with a specific theme or aesthetic. According to embodiments of the disclosure, several machine learning models are used to create, select, and place a variety of design elements to create a cohesive document.

Traditional methods for generating graphic design documents involve the manual selection and placement of individual elements, such as images, icons, colors, and fonts. These methods can be time-consuming, especially when customizing multiple elements or ensuring consistency across the entire document. Moreover, these methods depend on a user's specialized design skills to achieve visually appealing and harmonious results that effectively convey the desired theme or style. Less experienced users may be unable to generate acceptable documents without extensive experimentation.

Embodiments of the present disclosure improve the efficiency of a document generation system by using multiple machine learning models trained to create custom design elements for a design document consistent with a target theme. For example, a comprehensive set of design elements can be generated to align with a specific theme based on a user-provided text prompt. Some embodiments achieve this improved efficiency and accessibility by employing a combination of algorithmic components and machine learning models such as an image generation model, a color palette generation model, a text style components, and an icon selection components, to generate thematically consistent and visually appealing design elements. These generated elements are integrated into the original graphic design document by a document generation component, resulting in a custom graphic design document that effectively captures the desired theme or style without requiring extensive manual editing or specialized design skills from the user.

Image Processing System

Figure 1:
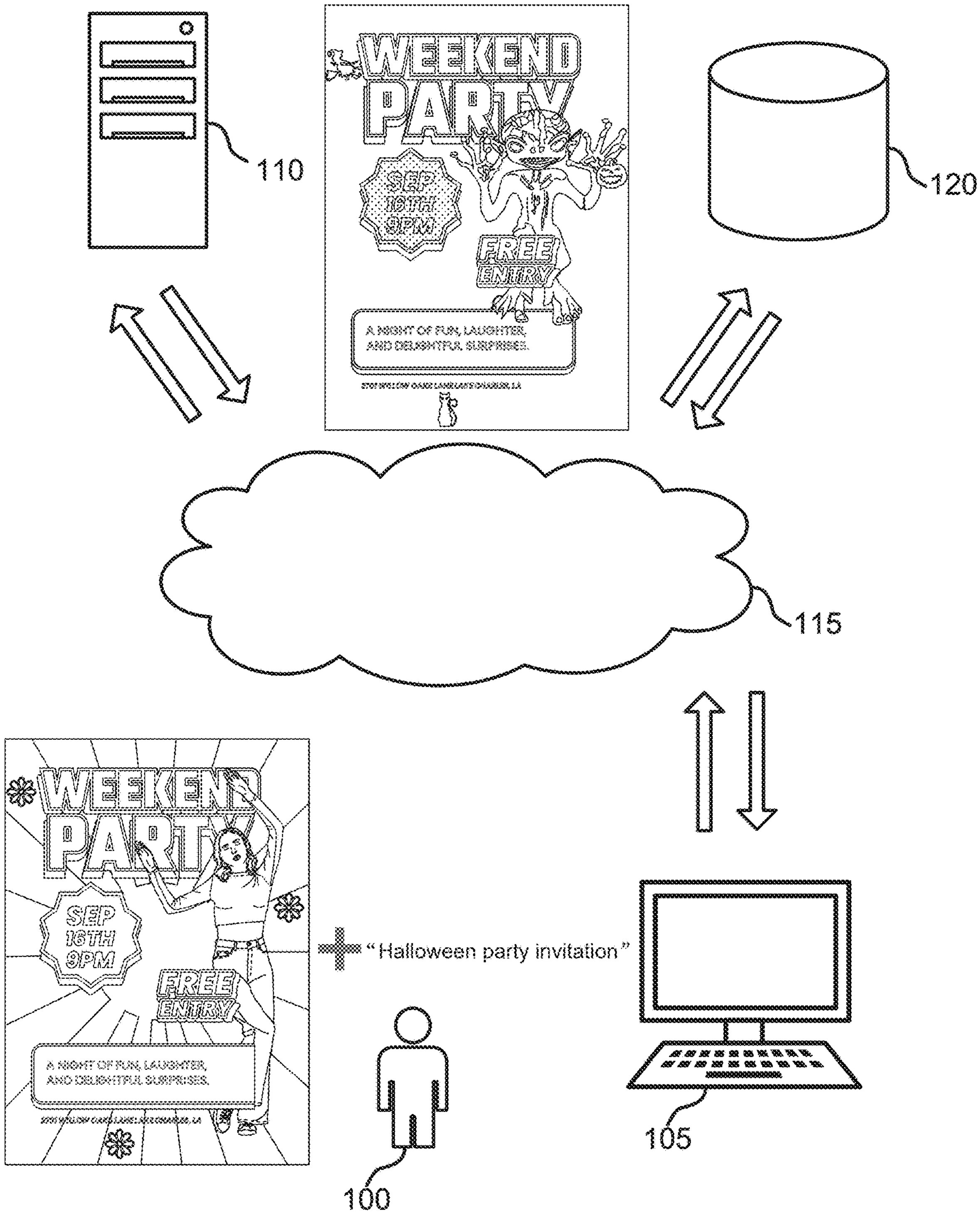
FIG. 1 shows an example of an image processing system according to aspects of the present disclosure.

FIG. 1 shows an example of an image processing system according to aspects of the present disclosure. The image processing system is an example of, or includes aspects of, the corresponding element described with reference to FIGS. 2-5, and 8. The example shown includes user 100, user device 105, image processing apparatus 110, cloud 115, and database 120. Image processing apparatus 110 is an example of, or includes aspects of, the corresponding element described with reference to FIG. 5.

In the example shown in FIG. 1, user 100 provides a text prompt, such as "Halloween party invitation," to the image processing apparatus 110, e.g., via user device 105 and cloud 115. The image processing apparatus 110 then processes this text prompt to understand the desired theme and style for the custom graphic design document. System 110 may comprise various components, each designed to handle specific aspects of the customization process. For example, an image generation model focuses on creating synthetic images that visually represent the Halloween theme. The original images in the input document are replaced by the synthetic images.

A text style component selects appropriate fonts and colors for the text elements. The color palette generation model generates a color scheme that complements the Halloween aesthetic, and the icon selection component identifies relevant icons to enhance the visual appeal of the document. The document generation component then combines these elements, such as the synthetic images, styled text, color palette, and icons, to generate a custom graphic design document that effectively captures the essence of a "Halloween party invitation." The final custom document demonstrates the system's ability to transform a textual description into a visually stunning and thematically coherent design. The resultant custom graphic design document is then returned to user 100 via cloud 115 and user device 105, ready for use or further customization if desired.

User device 105 may be a personal computer, laptop computer, mainframe computer, palmtop computer, personal assistant, mobile device, or any other suitable processing apparatus. In some examples, user device 105 includes software that incorporates an image processing application (e.g., query answering, image editing, relationship detection). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code that is sent to the user device 105 and rendered locally by a browser. The process of using the image processing apparatus 110 is further described with reference to FIG. 2.

Image processing apparatus 110 includes a computer implemented network comprising an image encoder, a text encoder, a multi-modal encoder, and a decoder. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIG. 3. Further detail regarding the operation of image processing apparatus 110 is provided with reference to FIGS. 6-7.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, database controllers may operate automatically without user interaction.

Figure 2:
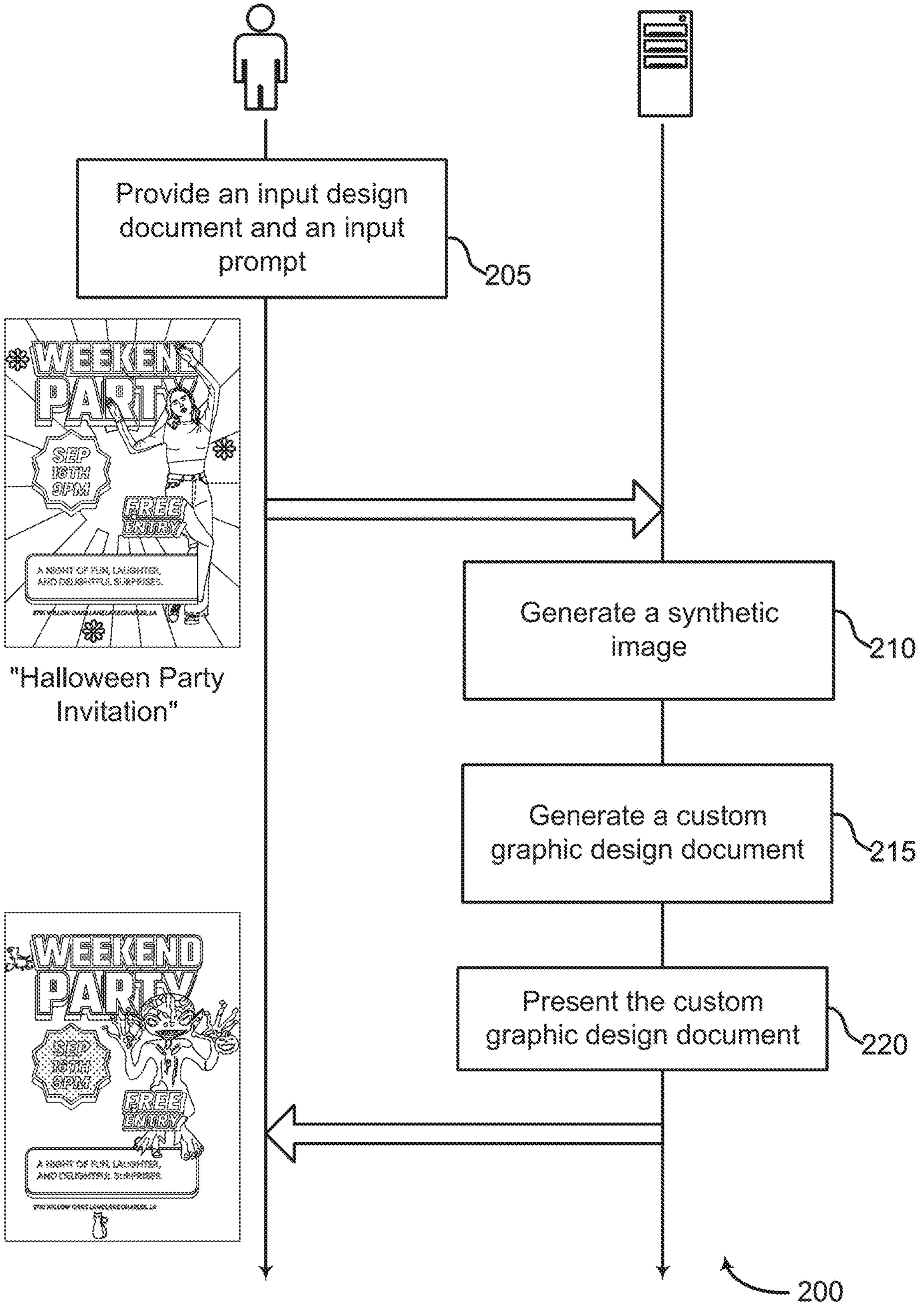
FIG. 2 shows an example of an image processing application according to aspects of the present disclosure.

FIG. 2 shows an example of an image processing application 200 according to aspects of the present disclosure. The image processing application 200 is an example of, or includes aspects of, the corresponding element described with reference to FIGS. 1, 3-5, and 8.

At operation 205, the user provides an input graphic design document and an input prompt. In some examples, the input graphic design document may be a template or an existing design that the user wants to customize. The input prompt may be descriptive, indicating the desired theme or style for the customization.

Figure 4:
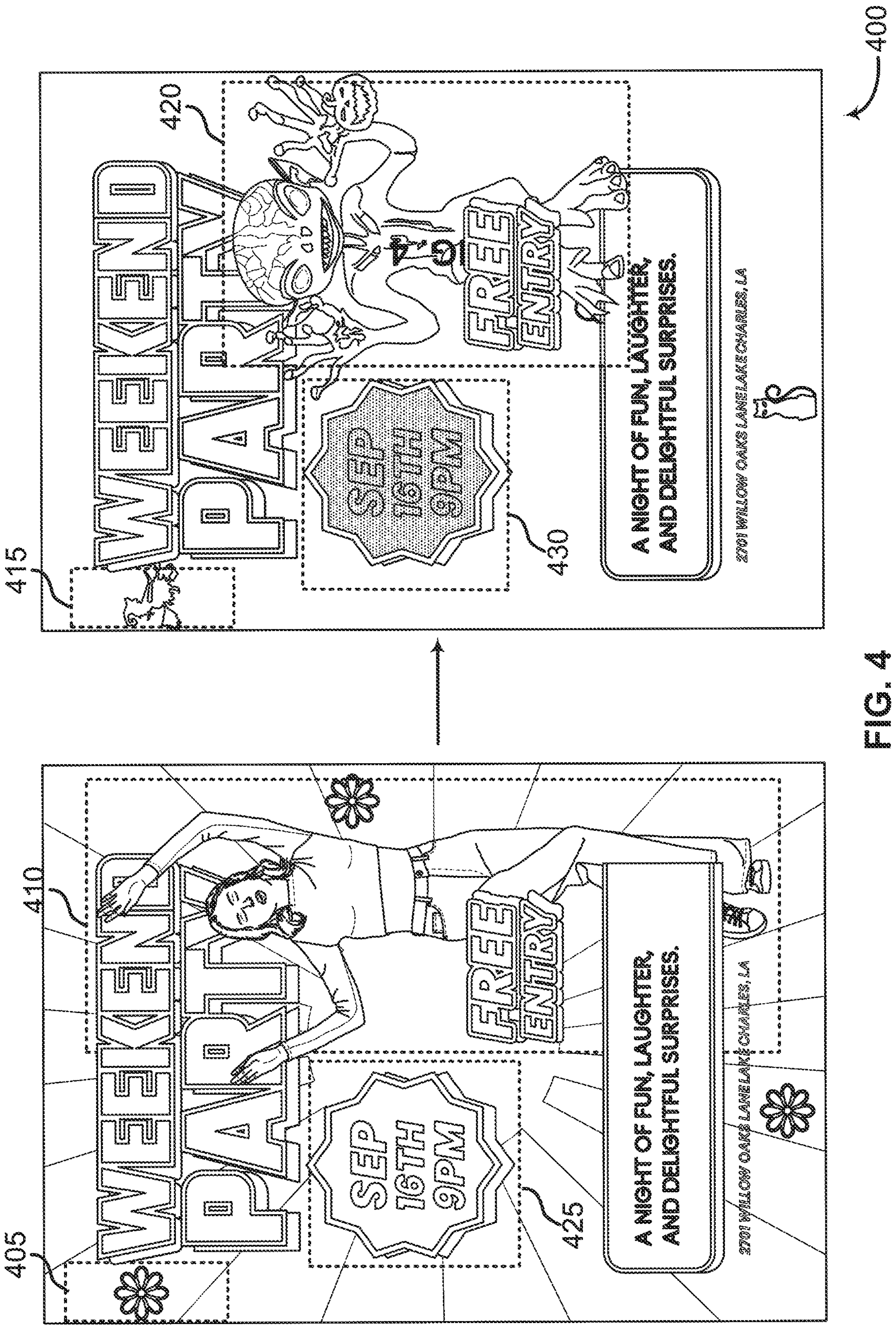
FIG. 4 shows an example of the input and the output graphic elements of a graphic design document customization pipeline according to aspects of the present disclosure.

For example, in operation 205, the user begins the customization process by providing an input graphic design document, such as the one described in FIG. 4, which includes a decorative flower icon, an image of a woman dancing at a party, and original text elements. Along with this document, the user inputs a text prompt, such as "Halloween party invitation," to specify the desired theme for the customization.

At operation 210, the system generates a set of design elements based on the input prompt and the input graphic design document. In some cases, the operations of this step are performed by a graphic design customization system as described with reference to FIGS. 1, 3-5, and 8. For example, at operation 210, the system processes the input prompt "Halloween party invitation" and analyzes the input graphic design document to generate a collection of design elements. This process may include synthesizing images that align with the Halloween theme. The synthesized image may be an image of a devil or ghost as illustrated in detail in FIG.

4. This process may also involve selecting appropriate icons, colors, and text styles that complement the overall aesthetic. Some example icons include a witch riding a broom as illustrated in detail in FIG. 4.

At operation 215, the system generates a custom graphic design document by integrating the generated design elements into the input graphic design document. In some cases, the operations of this step are performed by a graphic design customization system as described with reference to FIGS. 1, 3-5, and 8. For example, at operation 215, the system combines synthesized images, selected icons, colors, and text styles with the original layout and structure of the input graphic design document. In this way, the system is able to have the placement and sizing of the new elements to maintain the visual coherence and balance of the original design while effectively incorporating the Halloween theme.

At operation 220, the system presents the custom graphic design document to the user for review and further customization. In some cases, the operations of this step are performed by a graphic design customization system as described with reference to FIGS. 1, 3-5, and 8. For example, at operation 220, the system displays the generated custom graphic design document to the user, demonstrating the transformation of the original design into a Halloween-themed party invitation. The user can then assess the quality and appropriateness of the customization. The user can provide additional feedback or adjustments. The system's interactive features, such as the "Shuffle" and "Revert" options, allow the user to finetune specific elements of the design until they are satisfied with the final result.

Figure 3:
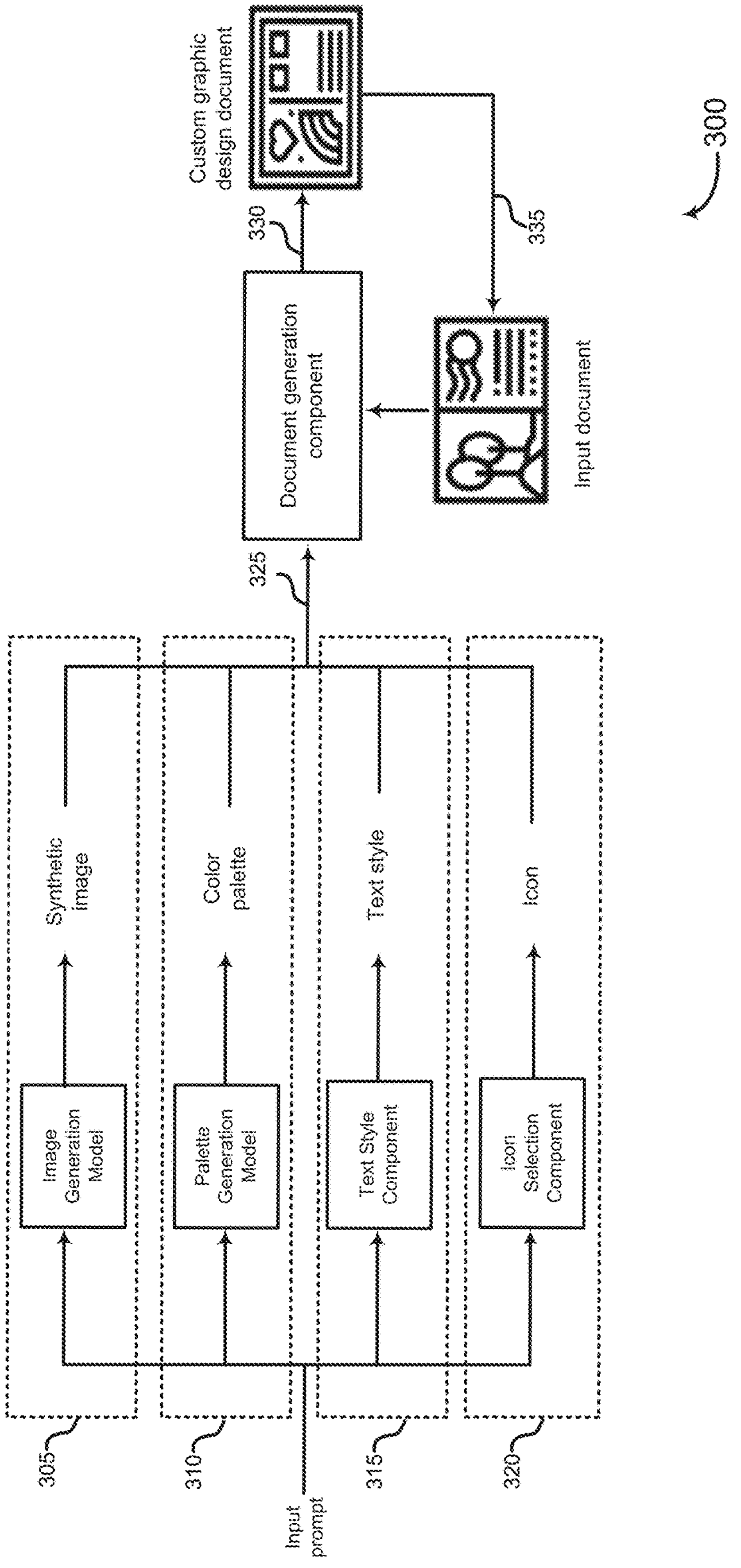
FIG. 3 shows an example of a graphic design document customization pipeline according to aspects of the present disclosure.

FIG. 3 shows an example of a graphic design document customization pipeline 300 according to aspects of the present disclosure. The graphic design document customization pipeline 300 is an example of, or includes aspects of, the corresponding element described with reference to FIGS. 1, 2, 4, 5, and 8.

According to embodiments of the present disclosure, a graphic template customization pipeline may take multi-modal inputs including a text prompt and an input document. The input document may be a graphic template to be customized. The graphic template customization pipeline includes a variation generator and a document generation component. The variation generator receives a text description about what new style to apply and what design items to change from an existing document. The document generation component has the responsibility to assemble the output document with the items coming out from the variation generator. The document generation component refines the output document by providing an interactive mechanism. The interactive mechanism allows the user to change a generated design item and pick a variation from a collection of new design elements.

The variation generator may include an image generation model, a palette generation model, a text style component, and an icon selection component. For example, the input document may be a template for a party invitation. The document generation component combines the proposals suggested by the variation generator, forming a variation document with the related possibilities. In some examples, the document generation component provides the user with options of Shuffle or Revert for more control.

The document generation component may implement continuous feedback between the user and the device. The graphic templates customization pipeline assembles the input template with all related design assets. The related design assets may include texts with corresponding properties, such as font family and size, colors, images, icons, and color palette. In some examples, the graphic templates customization pipeline customizes the input template in a single iteration in the design template. The output of the graphic template customization pipeline may include a design template where the color palette, images and icons of the design template are replaced.

In some examples, an input document may be an original design which a user wants to tailor for a Halloween Party. The input document may be a template for a party invitation. For example, the text prompt describes a target outcome as "Halloween party invitation." This prompt may indicate that fonts should not be changed. The system accordingly will change the style related items including images, icons, and colors.

In some embodiments, the user may not be satisfied with, for example, a monster image generated by the pipeline. The graphic templates customization pipeline may further provide the option to change the monster. Upon selecting the image element, a plurality of calls to action button decorations may be displayed on a user interface.

In some examples, after an image design asset is selected, the user may select the Shuffle option, and the image subsystem of the variation generator is activated. The image subsystem generates multiple variations. The user can click on a variation of the multiple variations. In this example, the original image in the input document is replaced with the one of the generated images selected by the user. In some examples, the revert action restores the previous action in reverse chronological order.

In this example, upon clicking "Shuffle", images with the same topic will be presented to the user. The topic may be various monsters. After selecting a new image, the new image will replace the selected one. This process can be applied to the icons. The icons can be replaced by selecting icons and clicking "Shuffle."

The output of the graphic template customization pipeline may be generated after a plurality of iterations, for example, two iterations. In this example, in the first iteration, the design template was initially customized. In the second iteration, the user selects the Shuffle operation. Finally, the design asset is replaced and rendered in the final design.

In some embodiments, the variation generator may determine specific graphical attributes or elements requiring modification based on the provided textual prompt. The variation generator determines the prompt that is subsequently directed to a plurality of subsystems. The plurality of subsystems may include Color Subsystem, Image Subsystem, Icon Subsystem and Font Subsystem. For example, when user may provide an input text prompt "Halloween party invitation." The variation generator determines, based on this input text prompt, that the Font Subsystem will not be activated.

In this example, the variation generator is called in the first phase on subsystems that run in parallel if not specified otherwise in the prompt. At each reshuffle call, only the subsystem related to the reshuffle element is called. This makes the entire pipeline efficient. For example, the entire pipeline runs in phase 1 on the time associated with the most expensive subsystem. The most expensive subsystem is the image one. In the subsequent phases, the entire pipeline runs on the time related to the called subsystem.

In some embodiments, the color subsystem utilizes a palette generation model trained on curated color schemes. The color subsystem can generate a color palette tailored to a specified subject. In some examples, the specified subject is indicated by a text prompt. Based on the user's selected topic, a corresponding color palette can be synthesized. The corresponding color palette can be used as a thematic color scheme for the document. For example, in the example of the user providing "Halloween party invitation" as the text prompt, indicating a target theme of the output document, the color subsystem may output recommendations including various shades of red, yellow, and orange.

In this example, a model $\phi: S \rightarrow ([0,255]^3)^N$ can be trained, where S represents the set of all strings, N is the number of colors from the palette generated. In this example, N is variable because $\phi$ is a transformer model that generates a set of tokens at the output, and the end token can be in any position. $\phi$ is an encoder-decoder model transformer that takes as input the prompt from the user and outputs a list of tokens $[t_1, t_2, \ldots, t_N, t_{end}, \ldots]$. This list is then detokenized into a list of colors. A $\pi$ tokenizer with the $\phi$ model can be trained where that the objective function in Formula 1 is minimized:

$$\mathcal{L} = \sum_{\substack{(t,c)\in\mathbb{T} \\ c\in([0,255]^3)^N, t\in S}} \sum_{i=1}^{N} \|\pi^{-1}(\phi(t))[i] - C[i]\|_2 \tag{1}$$

where $\mathbb{T}$ represents the training set formed by pairs (t, c) of texts $t \in S$ and color palettes $C \in ([0,255]^3)^N$, $\pi^{-1}$ represents the reverse operation of tokenization, and $$\|v\|_2 = \sqrt{\sum_{i=1}^{D} v[i]^2}$$

represents the Euclidian norm of the vector $v \in \mathbb{R}^D$.

In some examples, the training data may be obtained from an online platform, and the training data can be validated by the users as qualitative (e.g., $|\mathbb{T}|=0.15M$). In these examples, for the data used in training, the description $t \in S$ may originate from the template metadata or be generated using a captioning model applied to the template rendered as an image.

In these examples, by utilizing a model trained on curated color schemes, this system may efficiently generate custom color palettes based on text prompts. In these examples, by utilizing a model trained on curated color schemes, this system may efficiently generate custom color palettes based on text prompts, leading to significant time savings, enhancing consistency in design, and providing a tailored approach that adapts to specific themes and palettes. provide users with efficient, cohesive, and personalized color choices.

In some embodiments, the image subsystem may have a plurality of generative models including an image prompt model and an image generation model. The image prompt model provides a derived text prompt that is based on a topic that is indicated by the input. For example, a Halloween party invitation image may indicate a "happy monster." This "happy monster" may be a derived prompt that is then fed into an image generator model. The image generation model provides the output drawing or picture.

In some cases, a design document includes two types of images: subjects, such as the happy monsters, and backgrounds. The image subsystem makes a distinction between these two types of images. In these cases, the image generation algorithm runs twice, once for subject images and once for background images. In some examples, unlike backgrounds, subject images will be further processed with an additional background removal step.

The image prompt model may use feedback from users of a generative image pipeline. When a user generates a set of results using the generative image pipeline, the user may have the option to provide positive or negative feedback. The positive feedback may be used for fine-tuning a generative model of the encoder-decoder type. The fine-tuning process may use the prefix-tuning paradigm when the amount of training data is limited. The prefix-tuning paradigm involves training only a small set of prefix parameters while keeping the rest of the model frozen. Embodiments of the present disclosure demonstrate the prefix-tuning paradigm offers superior results compared to fine-tuning the entire network for this task. According to embodiments of the present disclosure, to increase the rate that the model will generate a text prompt that, when passed through the generative image pipeline, will output a high-quality image, prefix prompting is employed. Through an iterative optimization process, a prefix is learned. This prefix, when concatenated to the user prompt p, may maximize the quality of the image prompt model's output, conditioned by the quality of the image generated by the generic image model. The objective function is designed to be maximized during this process.

$$\mathcal{L} = \max_p \mathcal{A}\left(G(\underbrace{\eta(p+u)}_{y})\right) \Leftrightarrow \max_{\mathcal{A}(\mathcal{G}(y))} \log\ (p_\eta y \mid (p+u)) \tag{2}$$

where $\mathcal{A}$ is the LION Aesthetic classifier ($\mathcal{A}: M_{224,224}(([0,255]\cap\mathbb{Z})^3) \rightarrow \mathbb{R}$), $\mathcal{G}$ is the generative pipeline (for example, $\mathcal{G}: S \rightarrow M_{D_1,D_2}(([0,255]\cap\mathbb{Z})^3)$), $D_1$, $D_2$ are output dimensions of $\mathcal{G}$ (for example, in for some image generation model, $D_1=D_2=1024$)), $\eta$ is the image prompt model ($\eta: S \rightarrow S$), $p \in S$ is the prefix that is optimized, $u \in S$ is the user prompt, and $p_\eta$ is the language model distribution for $\eta$. In this example, p is calculated once and then concatenated to a prompt $u \in S$ of a user, where p is obtained using backpropagation.

The icon selection component generates texts that are suitable for searching into an icon or image library, based on a text prompt that describes the subject. These tags may be used to search into an icon library to populate the set of icons representing the replacement candidates.

To build the Icons Subsystem, an icon selection component is trained. The icon selection component is a generative encoder-decoder model in the prefix-tuning paradigm. This training may be in a similar way to the training of the image subsystem and the color subsystem. The training data may be from a design platform and is validated by the designers as being qualitative. The training data may include pairs of descriptions, templates, and sets of icons. For example, for each template in the design platform, all icons from that template are collected. For each icon, a description is obtained with a captioning model. Next, this description is transformed into a tag using a language model.

In some examples, on top of this fine-tuned model, a prefix $p \in S$ is optimized. The prefix $p \in S$ is concatenated to the user's prompt $u \in S$. A model $\psi$ is then obtained. In this example, $\psi$:

$$S \rightarrow S_W^N,$$

where $S_W$ represents the set of strings with a single word, and N is the number of tags in the output, $N \in \mathbb{N}^*$. In some examples, an icon library $\daleth$ is used. To obtain the icons $\{i_1, i_2, \ldots i_N\}\} \in \daleth$ corresponding to the output $\psi(p+u)=\{t_1, t_2, \ldots t_N\}$, $t_1 \in S$, $i \in \overline{1,N}$, the following function mapping is used:

$$i_j = i \in \daleth, \min_j \langle \pi_I(i_j), \pi_S(t_j) \rangle \tag{3}$$

where $\pi_I$ and $\pi_S$ are the image and text encoders respectively of a network with zero-shot capability of multimodal projection in the same latent space, such as CLIP, and < > is the cosine similarity.

In some embodiments, the text style component can suggest alternative font styles for text based on a text prompt. To achieve this, a transformer model is trained in a similar manner as described above. With an extra trick given by the following formula:

$$\mathcal{L} = \sum_{\substack{(t,F)\in\mathbb{T} \\ F\in\Delta, t\in S}} \sum_{i=1}^{N} \left\| \Omega\left(\pi^{-1}(\phi(t))[i]\right) - \Omega(F[i]) \right\|_2$$

Where $\Delta$ is a list of tokens for each font, $(t,F) \in \mathbb{T}$ can be ('Halloween party invitation', [Spooky Font Regular, Halloween Font Regular]) and $\Omega$ is font2vec (https://github.com/py-ranoid/font2vec)

Additionally, a prefix is trained as in the previous subsection, where the training data consists of pairs of template descriptions and sets of font names. In some examples, the cardinality of the training set $\mathbb{T}$ is $|\mathbb{T}|=0.15M$ where $\mathbb{T}=\{(s,(f_i)_{i\in\overline{1,N}})\}$, where $\rho \in S_N$ can be any permutation with cardinality N. By utilizing this approach, the recommended fonts are limited to those available in the training set $\mathbb{T}$. However, this does not represent a limitation because the training set may only contain templates validated by users as being qualitative.

In some embodiments, the document generation component performs the customization of the original document by replacing some graphic elements with the ones generated by the variation generator. The customization is based on the user text prompt that describes how the input document should be changed. In some examples, the changes may include the background, the subject images, icons, colors, and fonts. The document generation component may preserve some properties from the original document. For example, the document generation component may preserve the position and the size of an item.

In some examples, the document generation component provides variations for the elements when the user chooses to replace the elements. For example, the user may choose to replace an element using the "Shuffle" action button. The user may also want to bring the original element back using the "Revert" action button. In these examples, the document generation component provides flexibility in managing the generated content. In some examples, the document generation component allows the user to replace each element. In some examples, the document generation component also allows the user to bring back the original content.

Referring to FIG. 3, image generation process 305 involves using an image prompt model and an image generation model. The image prompt model generates a derived text prompt based on the input text prompt and the topic of the document. The derived text prompt is then fed into the image generation model, which produces a set of subject images and background images. The image generation process 305 corresponds to the Image Subsystem. In some examples, the image generation process 305 processes subject images and background images separately, applying additional background removal processing to the subject images.

The color palette generation process 310 involves using a palette generation model trained on designer-curated color schemes. The palette generation model takes the input text prompt and a set of design parameters to generate a color palette that aligns with the specified theme or style. The generated color palette may be used as thematic color scheme for the custom graphic design document.

The text style generation process 315 involves using the text style component that suggests font styles for the text in the document. In some examples, the text style generation process 315 uses a transformer model trained on pairs of template descriptions and font names. In some examples, the text style component takes the input text prompt and generates a set of recommended font styles that match the desired theme or style.

The icon selection process 320 involves using the icon selection component that assists in finding suitable icons from an icon library. This icon selection component generates a set of words or tags based on the input text prompt, which are then used to search the icon library. The retrieved icons serve as replacement candidates for the existing icons in the input document.

The document generation process 325 involves using the document generation component. The document generation component receives the outputs from the image generation, color palette generation, text style generation, and icon selection processes, along with the input document. In the document generation process 325, the document generation component generation component replaces the relevant graphic elements in the input document with the newly generated ones while aiming to preserve properties such as position and size whenever possible. The output of this process includes a custom graphic design document that incorporates the user's requested changes based on the input text prompt.

The replacement process 330 allows the user to interact with the generated custom graphic design document and make further refinements. Through the "Shuffle" action, the user can replace individual elements with alternative options generated by the respective processes. The "Revert" action enables the user to restore the original content for specific elements if desired. The user's modifications are then fed back into the document generation component, which produces an alternative custom graphic design document incorporating the latest changes.

The user's modifications and requests may be processed by the feedback process 335. The feedback process 335 facilitates the communication between the replacement process 330 and the document generation component. In some cases, when the user selects the "Shuffle" action, the feedback loop 335 sends a request to the document generation component to generate variations for the selected element. The document generation component then produces alternative options using the respective processes, such as the image generation process 305, color palette generation process 310, text style generation process 315, or icon selection process 320, depending on the type of element being modified.

In some cases, when the user chooses the "Revert" action, the feedback process 335 retrieves the original content for the selected element from the input graphic design document. This process enables the user to restore an element to the element's initial state if the generated variations do not meet the user's expectations or preferences.

In some examples, the feedback process 335 enables the iterative refinement of the custom graphic design document. This process allows for the generation of alternative element variations and the retrieval of original content as needed. In some examples, this iterative process continues until the user indicates satisfaction with the final custom graphic design document.

The integration of these processes and components forms a comprehensive pipeline that enables the customization of graphic design documents based on user-provided text prompts. The iterative processing of the pipeline, with the feedback loop between the document generation process and the replacement process, allows for fine-grained control and refinement of the generated content until the user is satisfied with the output.

FIG. 4 shows an example of the input and the output graphic elements of a graphic design document customization pipeline according to aspects of the present disclosure. The document generation process 400 is an example of, or includes aspects of, the corresponding element described with reference to FIGS. 1-3, 5, and 8. In this example, the user provides the text prompt "Halloween party invitation" that guides the customization of the original document.

Referring to FIG. 4, the input and output graphic elements processed by the graphic design document customization pipeline are illustrated. In the example illustrated by FIG. 4, the user provides the text prompt "Halloween party invitation," which guides the customization of the original document.

The original document includes an original icon 405, an original image 410, and original texts 425. The original icon 405 depicts a decorative flower. The original image 410 depicts a woman dancing. In this example, the icon selection component may analyze the original icon 405 and determine that the original icon 405 does not align with the Halloween theme specified in the text prompt. Consequently, the icon selection component generates a set of words or tags related to Halloween, searches the icon library, and retrieves a suitable replacement icon. In this example, the suitable replacement icon is the custom icon 415 that depicts a witch riding a broom is selected as it aligns with the Halloween theme.

In this example, the image generation process processes the original image 410. Based on the text prompt, the image generation process generates a derived text prompt related to Halloween and uses the image generation model to produce a custom image 420 depicting a devil or ghost, which reinforces the Halloween theme.

In this example, the text style generation process analyzes the original texts 425 and determines that the existing font style is suitable for the Halloween theme. As a result, the custom texts 430 maintain the same font style as the original texts 425. In this example, the color palette generation process generates a color palette based on the text prompt and the Halloween theme. This color palette is applied to the custom texts 430, modifying their color to ensure consistency with the overall theme of the custom graphic design document.

The document generation component combines the outputs from the icon selection component, image generation process, text style generation process, and color palette generation process to create the custom graphic design document. This document includes the custom icon 415, custom image 420, and custom texts 430, all of which have been modified to align with the Halloween theme while preserving the layout and positioning of the original elements.

The user can then interact with the custom graphic design document through the replacement process, using the "Shuffle" and "Revert" actions to refine the generated content further. This iterative process allows for fine-grained control and customization until the user is satisfied with the final Halloween party invitation design.

Image Processing Apparatus

An apparatus for image processing is described. One or more aspects of the apparatus include at least one processor; at least one memory storing instruction executable by the at least one processor; an image generation model configured to generate a synthetic image based on an input prompt, wherein the input prompt indicates a target theme; a text style component configured to select a text style for a text element of an input graphic design document based on the input prompt; and a document generation component configured to generate a custom graphic design document having the target theme, wherein the custom graphic design document includes the text element with the text style and a synthetic image at a location of the image element of the input graphic design document.

Some examples of the apparatus and method further include a language generation model configured to generate an image generation prompt based on the input prompt, wherein the synthetic image is generated based on the image generation prompt. Some examples of the apparatus and method further include a palette generation model configured to generate a color palette based on the input prompt, wherein the custom graphic design document includes a color from the color palette.

Some examples of the apparatus and method further include an icon selection component configured to obtain an icon based on the input prompt, wherein the custom graphic design document includes the icon. In some aspects, the text style component is further configured to encode the input prompt to obtain a prompt encoding, compare the prompt encoding to a font encoding, and select a font corresponding to the font encoding based on the comparison, wherein the text style comprises the font. Some examples of the apparatus and method further include a background removal component configured to remove a background from the synthetic image.

Figure 5:
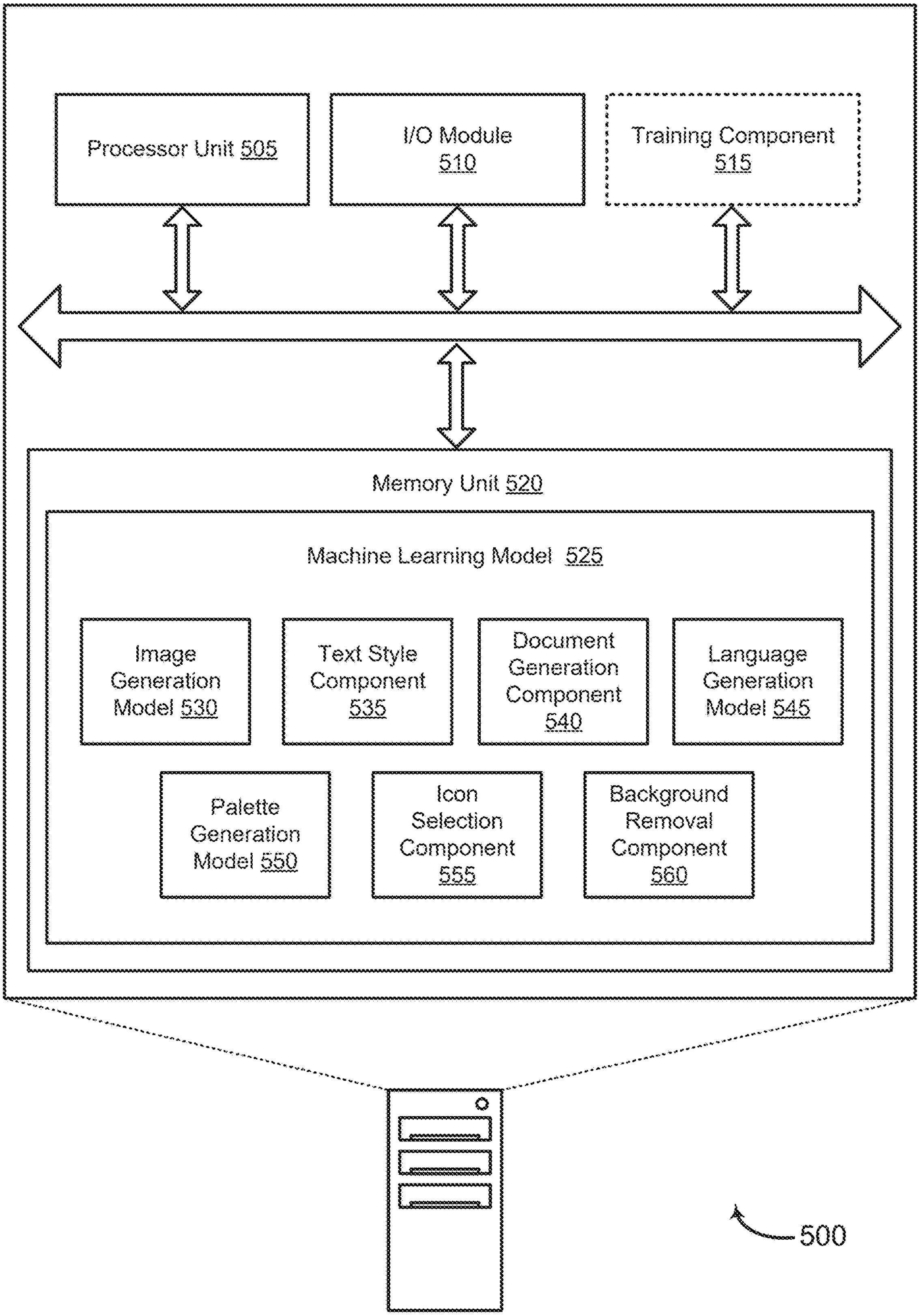
FIG. 5 shows an example of an image processing apparatus according to aspects of the present disclosure.

FIG. 5 shows an example of image processing apparatus 500 according to aspects of the present disclosure. The image processing apparatus 500 is an example of, or includes aspects of, the corresponding element described with reference to FIGS. 1-4, and 8.

In one aspect, image processing apparatus 500 includes processor unit 505, I/O module 510, training component 515, memory unit 520, and machine learning model 525. Machine learning model 525 may include image generation model 530, text style component 535, document generation component 540, language generation model 545, palette generation model 550, icon selection component 555, background removal component 560.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 505 is configured to operate a memory array using a memory controller. In other cases, a memory controller is integrated into processor unit 505. In some cases, processor unit 505 is configured to execute computer-readable instructions stored in memory unit 520 to perform various functions. In some aspects, processor unit 505 includes special purpose components for modem processing, baseband processing, digital signal processing, or transmission processing. According to aspects, processor unit 505 comprises one or more processors described with reference to FIG. 8.

Memory unit 520 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 505 to perform various functions described herein.

In some cases, memory unit 520 includes a basic input/output system (BIOS) that controls basic hardware or software operations, such as an interaction with peripheral components or devices. In some cases, memory unit 520 includes a memory controller that operates memory cells of memory unit 520. For example, the memory controller may include a row decoder, column decoder, or both. In some cases, memory cells within memory unit 520 store information in the form of a logical state. According to aspects, memory unit 520 comprises the memory subsystem described with reference to FIGS. 1-4, 6, and 9.

According to aspects, image generation apparatus 500 uses one or more processors of processor unit 505 to execute instructions represented by parameters stored in memory unit 520 to perform functions described herein. For example, in some cases, the image generation apparatus 500 obtains a prompt describing an image element. For example, the image element may correspond to a plurality of concepts.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the neural network's ability to capture complex patterns in data. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In FIG. 5, machine learning model 525 includes image generation model 530, text style component 535, document generation component 540, language generation model 545, palette generation model 550, icon selection component 555, and background removal component 560.

The image generation model 530 generates synthetic images based on the input text prompt and the derived text prompt produced by the language generation model 545. In some examples, the image generation model 530 creates visually appealing images that align with the specified theme or style.

In some examples, the image generation model 530 comprises a diffusion model. Diffusion models are a class of generative neural networks which can be trained to generate new data with features similar to features found in training data. In particular, diffusion models can be used to generate novel media items such as images, audio files, videos, three-dimensional (3D) models or other digital media items. Diffusion models can be used for various media processing tasks including image super-resolution, generation of media items with perceptual metrics, conditional generation (e.g., generation based on text guidance), image inpainting, and media manipulation.

Diffusion models work by iteratively adding noise to the data during a forward process and then learning to recover the data by denoising the data during a reverse process. For example, during training, the guided diffusion model may take an original media item in a pixel space as input and apply forward diffusion process to gradually add noise to the original media item to obtain noisy media item at various noise levels.

Next, a reverse diffusion process (e.g., a U-Net that applies a sequence of convolution layers) gradually removes the noise from the noisy media item at the various noise levels to obtain an output media item. In some cases, an output media item is created from each of the various noise levels. The output media item can be compared to the original media item to train the reverse diffusion process.

The reverse diffusion process can also be guided based on a text prompt, or another guidance prompt, such as an image, a layout, a segmentation map, etc. The text prompt can be encoded using a text encoder (e.g., a multimodal encoder) to obtain guidance features in the guidance space. The guidance features can be combined with the noisy media item at one or more layers of the reverse diffusion process to ensure that the output media item includes content described by the text prompt. For example, guidance features can be combined with the noisy features using a cross-attention block within the reverse diffusion process.

Methods of operating diffusion models include a Denoising Diffusion Probabilistic Model (DDPM) and a Denoising Diffusion Implicit Models (DDIM). In DDPM, the generative process includes reversing a stochastic Markov diffusion process. DDIMs, on the other hand, use a deterministic process so that the same input results in the same output. In some cases, DDIM can reduce the number of timesteps during media generation. Diffusion models may also be characterized by whether the noise is added to the media item itself, or to media features generated by an encoder (i.e., latent diffusion). In a pixel diffusion model, noise is added and removed in pixel space. In a latent diffusion model, the noise is added (and removed) in a latent space of media features rather than in pixel space. Thus, a latent diffusion model generates media features using reverse diffusion, and these media features can be decoded to obtain a synthetic media item.

The text style component 535 analyzes the original texts in the document and suggests alternative font styles that match the target theme or style specified in the text prompt. In some examples, text style component 535 generates the text styles in the custom graphic design document that are visually consistent with the overall theme.

The document generation component 540 combines the outputs from various other components, such as the image generation model 530, text style component 535, palette generation model 550, and icon selection component 555, to create the custom graphic design document. In some examples, the document generation component 540 integrates the generated elements into the original document layout while maintaining the positioning and size of the elements.

The language generation model 545 may generate derived text prompts based on the user's input text prompt. For example, the derived text prompts are used by the image generation model 530 to generate theme-specific content. The language generation model 545 may be used to create meaningful and relevant prompts that guide the customization process. In some examples, the language generation model 545 comprises a transformer model that generates the text prompt by autoregressively predicting a sequence of tokens using one or more attention layers.

The palette generation model 550 generates color palettes that align with the specified theme or style in the text prompt. In some examples, the palette generation model 550 generates color palettes used in the custom graphic design document to reinforce the desired theme or style.

The icon selection component 555 analyzes the original icons in the document and searches an icon library for suitable replacements that match the specified theme or style. In some examples, the icon selection component 555 selects appropriate icons that enhance the visual appeal and thematic coherence of the custom graphic design document.

The background removal component 560 may be used to handle the separate processing of foreground and background elements in images. In some examples, the background removal component 560 removes the background from the subject images, allowing for more targeted and precise customization of the foreground elements in line with the specified theme or style.

Image Processing Method

Figure 6:
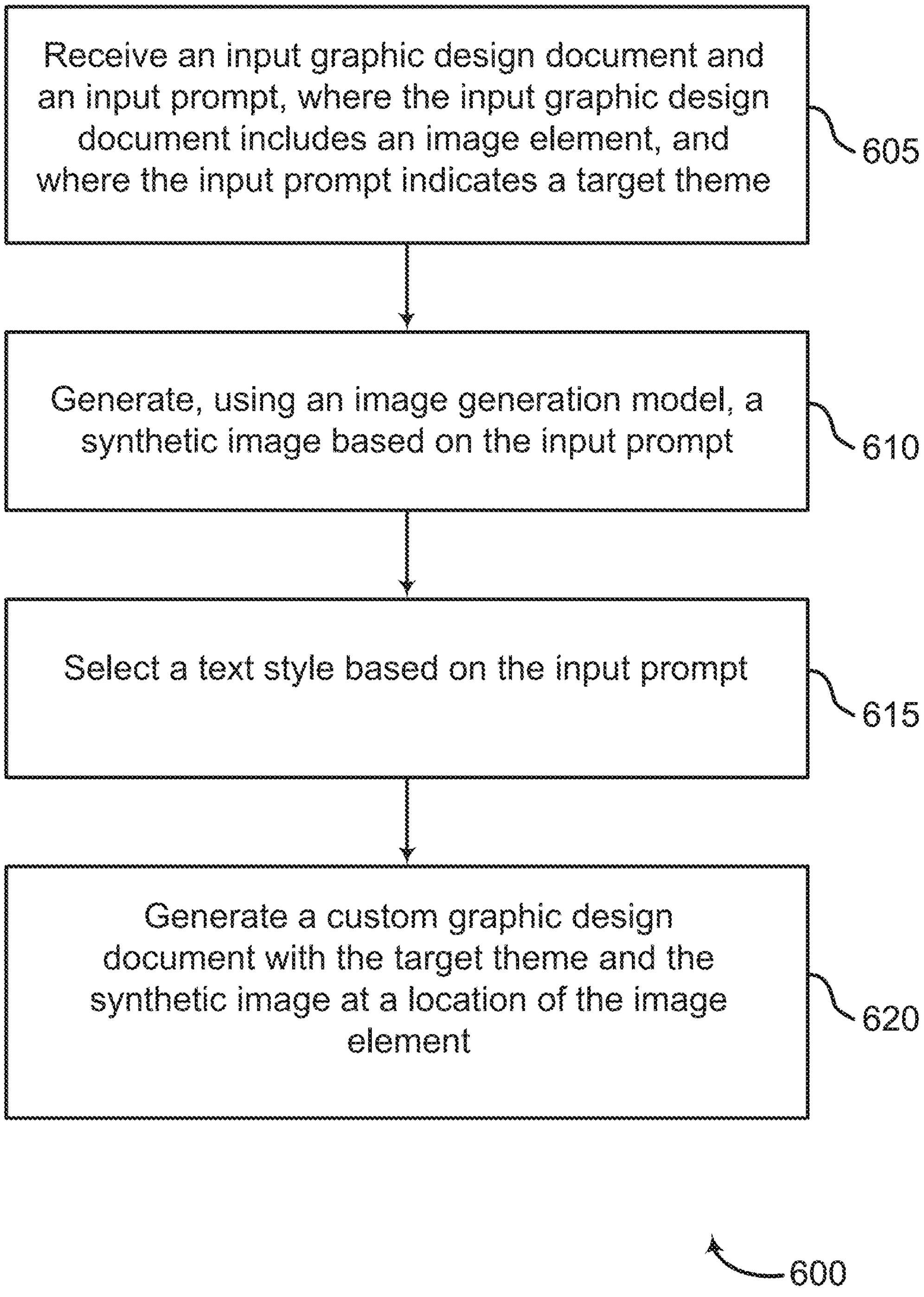
FIG. 6 shows an example of an image processing method 600 according to aspects of the present disclosure.

FIG. 6 shows an example of an image processing method 600 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives an input graphic design document and an input prompt, where the input graphic design document an image element, and where the input prompt indicates a target theme. In some cases the input graphic design document includes a text element. In some cases, the operations of this step refer to, or may be performed by, a machine learning model as described with reference to FIG. 5.

In some examples, the input graphic design document is used as a template or starting point for the customization process. The input prompt guides the system in determining the desired theme or style for the customized document. In some examples, the same input prompt is used as the input of a plurality of subsystems with reference to FIG. 3.

At operation 610, the system generates, using an image generation model, a synthetic image based on the input prompt. In some cases, the operations of this step refer to, or may be performed by, an image generation model as described with reference to FIG. 5. The synthetic image may be used to replace the original image element in the input graphic design document.

In some examples, the image generation model takes the input prompt and generates a synthetic image that visually represents the target theme or style. In some examples, a custom prompt may be generated based on an image generation prompt. In some examples, the image generation prompt is different from the input prompt. In some examples, the input prompt can be encoded and used to generate an image generation prompt using a language generation model. For example, the image generation prompt may be based on the input prompt and provide more detailed and specific guidance for the image generation process.

In some examples, the image generation model may generate multiple synthetic images based on the input prompt. These additional synthetic images may be used to provide alternative foreground images or background images, giving the user more options to choose from during the customization process. In some examples, the system may apply background removal techniques to the generated synthetic images.

Optionally, at operation 615, the system selects a text style for the text element based on the input prompt. In some cases, the operations of this step refer to, or may be performed by, a text style component as described with reference to FIG. 5.

In some examples, at operation 615, the system uses the text style component to analyze the input prompt and determines an appropriate text style that complements the target theme. For example, operation 615 may involve selecting a font, font size, color, and other typographic properties that visually align with the desired style.

In some examples, to select the most suitable font, the system may encode the input prompt to obtain a vector representation of the input prompt and compare the encoded input prompt with font encodings. By measuring the similarity between the prompt encoding and font encodings, the system can identify the font that best matches the target theme. In some examples, the system may generate a color palette based on the input prompt and select a text color from this palette.

At operation 620, the system generates a custom graphic design document having the target theme, where the custom graphic design document includes the text element with the text style and the synthetic image at a location of the image element. In some cases, the operations of this step refer to, or may be performed by, a document generation component as described with reference to FIG. 5.

In some examples, operation 620 involves using the document generation component to combine the styled text element and the generated synthetic image, along with other relevant elements such as icons or color palettes, to create the final custom graphic design document. In some cases, a machine learning model may be used to generate the custom graphic design document. In other cases, the custom graphic design document is generated algorithmically using components generated by the image generation model and other components of the system. For example, the input graphic design component can be used as a template for generating the custom graphic design document, where a location of text and image elements in the input graphic design document can be used as locations for corresponding elements of the custom graphic design document.

Operation 620 ensures that the layout and composition of the document remain visually appealing and cohesive, with all elements working together to convey the target theme. In some examples, the system may generate multiple custom graphic design documents by exploring different combinations of synthetic images and text styles. For example, this method gives users the flexibility to choose the most suitable design for their needs. In some examples, the system may obtain relevant icons based on the input prompt and incorporate them into the custom graphic design document, further increasing visual appeal and thematic coherence.

Figure 7:
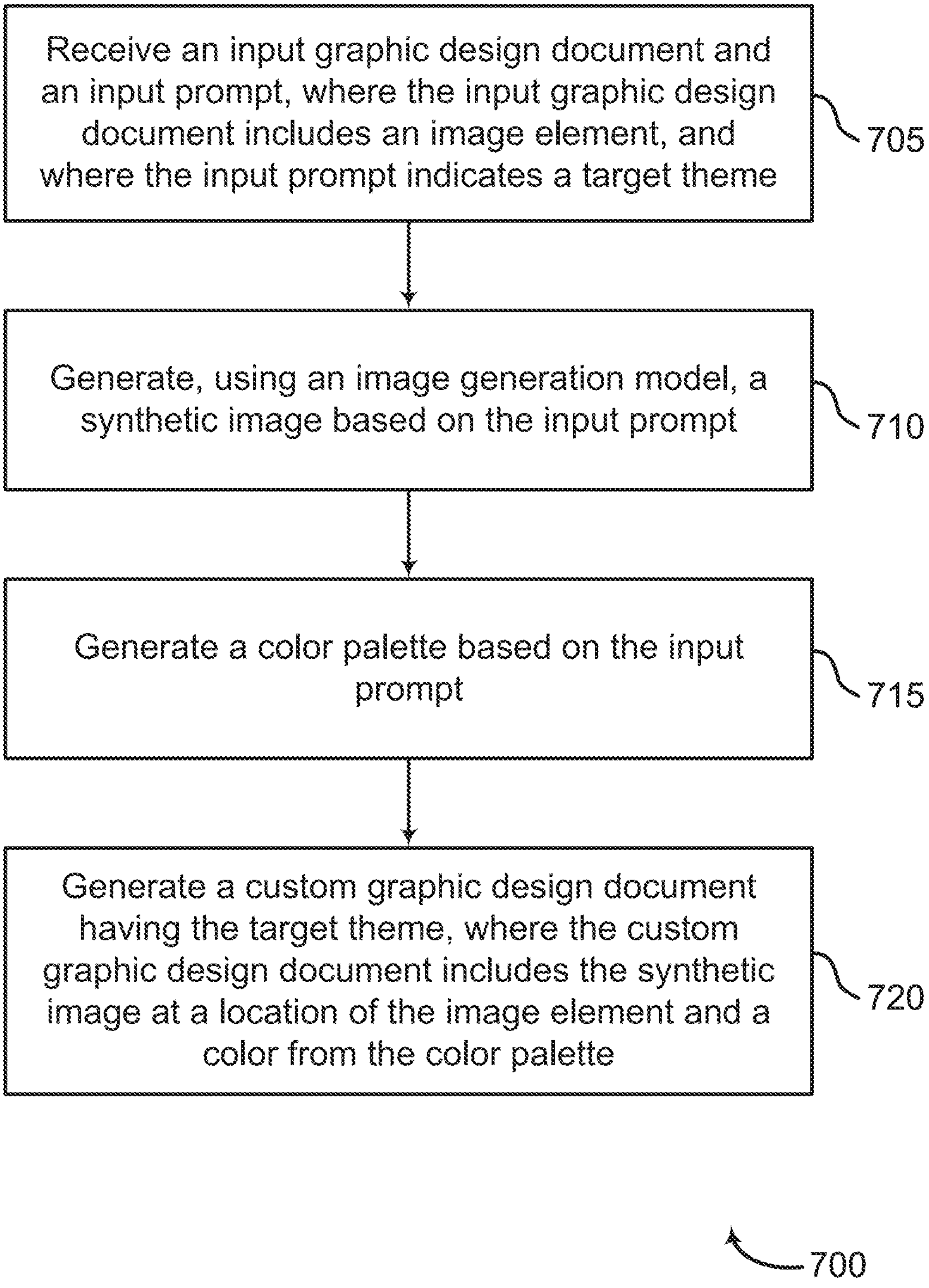
FIG. 7 shows an example of an image processing method 700 according to aspects of the present disclosure.

FIG. 7 shows an example of an image processing method 700 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives an input graphic design document and an input prompt, where the input graphic design document includes an image element, and where the input prompt indicates a target theme. In some cases, the operations of this step refer to, or may be performed by, a machine learning model as described with reference to FIG. 5.

In some examples, the input graphic design document is used as the foundation for the customization process. The input prompt provides the system with the necessary information about the desired theme or style. A machine learning model may be used to process the input and generate the custom graphic design document accordingly.

At operation 710, the system generates, using an image generation model, a synthetic image based on the input prompt. In some cases, the operations of this step refer to, or may be performed by, an image generation model as described with reference to FIG. 5.

In some examples, the image generation model takes the input prompt and generates a synthetic image that visually represents the target theme. This synthetic image will replace the existing image element in the input graphic design document, ensuring that the visual content aligns with the desired style.

At operation 715, the system generates a color palette based on the input prompt. In some cases, the operations of this step refer to, or may be performed by, a palette generation mode as described with reference to FIG. 5.

In some examples, the system uses the palette generation model to analyze the input prompt and generates a color palette that complements the target theme. This color palette is then used to ensure visual consistency and harmony throughout the custom graphic design document. The model may employ various techniques, such as color theory principles, data-driven approaches, or machine learning algorithms, to generate aesthetically pleasing and thematically appropriate color combinations.

At operation 720, the system generates a custom graphic design document having the target theme, where the custom graphic design document includes the synthetic image at a location of the image element and a color from the color palette. In some cases, the operations of this step refer to, or may be performed by, a document generation component as described with reference to FIG. 5.

In some examples, the system uses a document generation component to combine the generated synthetic image and the color palette to create the final custom graphic design document. In this way, the synthetic image is integrated into the document at the location of the original image element, maintaining the overall layout and composition. In some examples, the synthetic image may have a different compared with the original image in the input document.

In some examples, the custom document has the same size as the input document. In some examples, the document generation component applies colors from the generated color palette to various elements within the document, such as backgrounds, text, or graphic elements, to achieve a cohesive and visually appealing design that aligns with the target theme.

Figure 8:
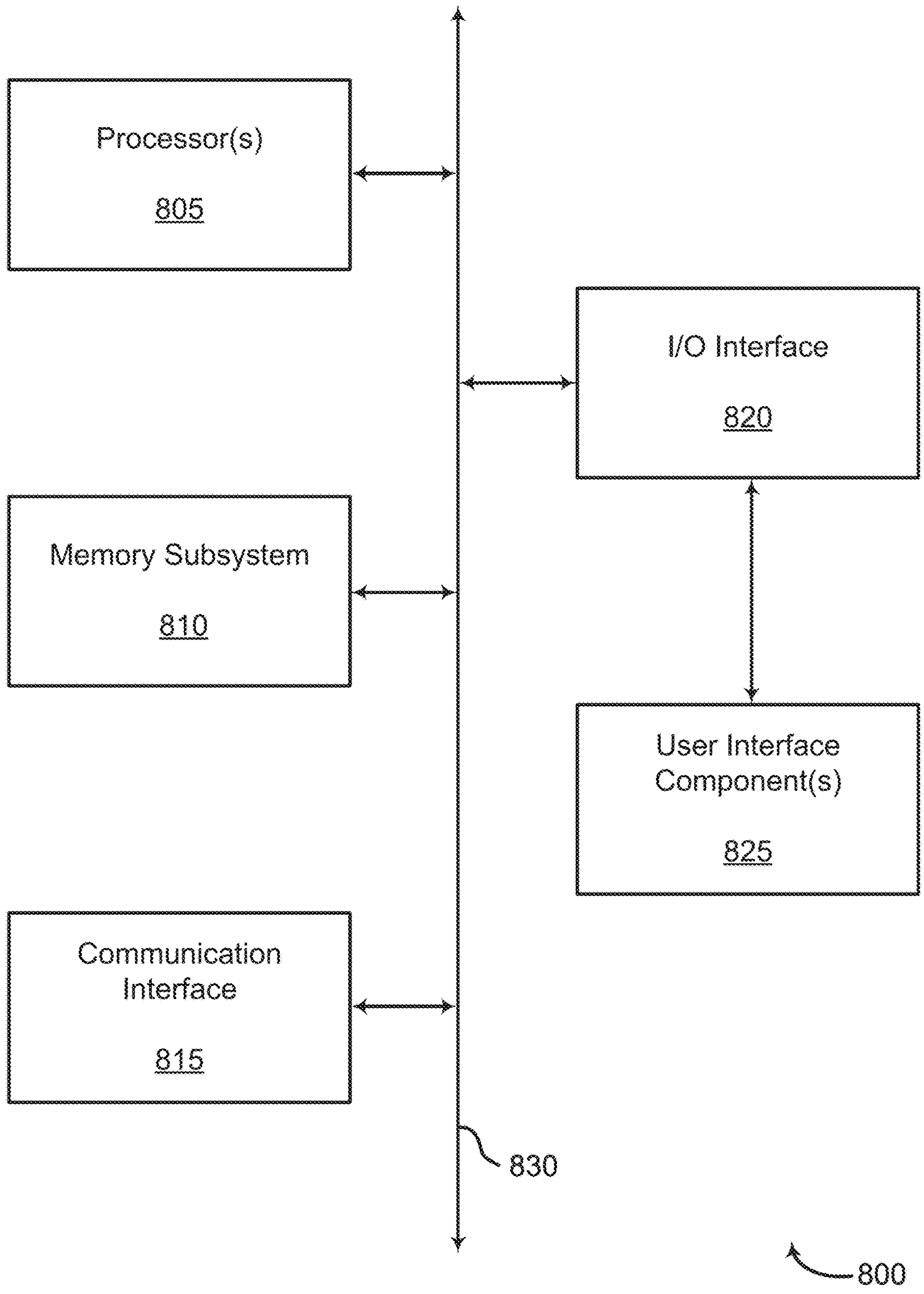
FIG. 8 shows an example of an image processing device according to aspects of the present disclosure.

FIG. 8 shows an example of a computing device 800 according to aspects of the present disclosure. The computing device 800 is an example of, or includes aspects of, the corresponding element described with reference to FIGS. 1-5. The computing device 800 includes processor(s) 805, memory subsystem 810, communication interface 815, I/O interface 820, user interface component(s) 825, and channel 830.

In some embodiments, computing device 800 is an example of, or includes aspects of, the image generation apparatus described with reference to FIGS. 1-5. In some embodiments, computing device 800 includes one or more processors 805 that can execute instructions stored in memory subsystem 810 to generate synthetic images comprising a first attribute and a second attribute by providing a first attribute token to a first set layers of the image generation model during a first set of time-steps and providing a second attribute token to a second set of layers of the image generation model during a second set of time-steps.

According to some aspects, computing device 800 includes one or more processors 805. Processor(s) 805 are an example of, or includes aspects of, the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 810 includes one or more memory devices. Memory subsystem 810 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 815 operates at a boundary between communicating entities (such as computing device 800, one or more user devices, a cloud, and one or more databases) and channel 830 and can record and process communications. In some cases, communication interface 815 is provided to enable a processing system coupled to a transceiver (e.g., a transmitter and/or a receiver). In some examples, the transceiver is configured to transmit (or send) and receive signals for a communications device via an antenna.

According to some aspects, I/O interface 820 is controlled by an I/O controller to manage input and output signals for computing device 800. In some cases, I/O interface 820 manages peripherals not integrated into computing device 800. In some cases, I/O interface 820 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 820 or via hardware components controlled by the I/O controller.

According to some aspects, user interface component 825 enables a user to interact with computing device 800. In some cases, user interface component 825 includes an audio device, such as an external speaker system, an external display device such as a display screen, an input device (e.g., a remote-control device interfaced with a user interface directly or through the I/O controller), or a combination thereof. In some cases, user interface component 825 includes a GUI.

Thus, the present disclosure describes a method for image processing. One or more aspects of the method include receiving an input graphic design document and an input prompt, wherein the input graphic design document includes a text element and an image element, and wherein the input prompt indicates a target theme; generating, using an image generation model, a synthetic image based on the input prompt; selecting a text style for the text element based on the input prompt; and generating a custom graphic design document having the target theme, wherein the custom graphic design document includes the text element with the text style and the synthetic image at a location of the image element.

Some examples of the method, apparatus, and non-transitory computer readable medium further include generating, using a language generation model, an image generation prompt based on the input prompt, wherein the synthetic image is generated based on the image generation prompt. Some examples of the method, apparatus, and non-transitory computer readable medium further include generating, using the image generation model, an additional synthetic image based on the input prompt. In some aspects, the synthetic image comprises a foreground image, and the additional synthetic image comprises a background image. In some aspects, the synthetic image comprises a foreground image, and the additional synthetic image comprises an alternative foreground image.

Some examples of the method, apparatus, and non-transitory computer readable medium further include removing a background from the synthetic image. Some examples of the method, apparatus, and non-transitory computer readable medium further include selecting the text style comprises encoding the input prompt to obtain a prompt encoding; comparing the prompt encoding to a font encoding; and selecting a font corresponding to the font encoding based on the comparison, wherein the text style comprises the font.

Some examples of the method, apparatus, and non-transitory computer readable medium further include generating a color palette based on the input prompt, wherein the custom graphic design document includes a color from the color palette. Some examples of the method, apparatus, and non-transitory computer readable medium further include selecting the text style comprises selecting a text color from the color palette, wherein the text style comprises the text color from the color palette. In some aspects, the synthetic image is generated based on the color palette. Some examples of the method, apparatus, and non-transitory computer readable medium further include obtaining an icon based on the input prompt, wherein the custom graphic design document includes the icon.

Some examples of the method, apparatus, and non-transitory computer readable medium further include generating a plurality of synthetic image and a plurality of text styles based on the input prompt. Some examples further include generating a plurality of custom graphic design documents based on different combinations of the plurality of synthetic image and the plurality of text styles, respectively.

A method for image processing is described. One or more aspects of the method include receiving an input graphic design document and an input prompt, wherein the input graphic design document includes an image element, and wherein the input prompt indicates a target theme; generating, using an image generation model, a synthetic image based on the input prompt; generating a color palette based on the input prompt; and generating a custom graphic design document having the target theme, wherein the custom graphic design document includes the synthetic image at a location of the image element and a color from the color palette.

Some examples of the method, apparatus, and non-transitory computer readable medium further include encoding the input prompt to obtain a prompt encoding. Some examples further include comparing the prompt encoding to a font encoding. Some examples further include selecting a font corresponding to the font encoding based on the comparison, wherein the custom graphic design document comprises a text element with the font.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

receiving an input graphic design document and an input prompt, wherein the input graphic design document includes an image element, and wherein the input prompt indicates a target theme different from a theme of the input graphic design document;

generating, using an image generation model, a synthetic image based on the input prompt, wherein the synthetic image has the target theme; and generating a custom graphic design document based on the input graphic design document and the synthetic image, wherein the custom graphic design document has the target theme and includes the synthetic image at a location of the image element of the input graphic design document.

2. The method of claim 1, further comprising:

selecting a text style for a text element based on a vector representation of the input prompt, wherein the custom graphic design document includes a text element from the input graphic design document with the selected text style.

3. The method of claim 2, wherein selecting the text style comprises:

encoding the input prompt to obtain a prompt encoding;

comparing the prompt encoding to a font encoding; and selecting a font corresponding to the font encoding based on the comparison, wherein the text style comprises the font.

4. The method of claim 1, wherein generating the synthetic image comprises:

generating, using a language generation model, an image generation prompt based on the input prompt, wherein the synthetic image is generated based on the image generation prompt.

5. The method of claim 1, further comprising:
generating, using the image generation model, an additional synthetic image based on the input prompt, wherein the custom graphic design document includes the additional synthetic image.

6. The method of claim 5, wherein:
the synthetic image comprises a foreground image, and the additional synthetic image comprises a background image or an alternative foreground image.

7. The method of claim 1, further comprising:
removing a background from the synthetic image.

8. The method of claim 1, further comprising:
generating a color palette based on the input prompt, wherein the custom graphic design document includes a color from the color palette.

9. The method of claim 8, further comprising:
selecting a text color from the color palette, wherein a text style comprises the text color from the color palette.

10. The method of claim 8, wherein:
the synthetic image is generated based on the color palette.

11. The method of claim 1, further comprising:
generating a plurality of synthetic images and a plurality of text styles based on the input prompt; and
generating a plurality of custom graphic design documents based on different combinations of the plurality of synthetic images and the plurality of text styles, respectively.

12. A non-transitory computer readable medium storing code for implementing document generation, the code comprising instructions executable by at least one processor to perform operations comprising:
receiving an input graphic design document and an input prompt, wherein the input graphic design document includes an image element, and wherein the input prompt indicates a target theme different from a theme of the input graphic design document;
generating, using an image generation model, a synthetic image based on the input prompt, wherein the synthetic image has the target theme; and
generating a custom graphic design document based on the input graphic design document and the synthetic image, wherein the custom graphic design document has the target theme and includes the synthetic image at a location of the image element of the input graphic design document.

13. The non-transitory computer readable medium of claim 12, the code further comprising instructions further executable by the at least one processor to perform operations comprising:
generating, using a palette generation model, a color palette based on the input prompt, wherein the custom graphic design document includes colors from the color palette.

14. The non-transitory computer readable medium of claim 12, the code further comprising instructions further executable by the at least one processor to perform operations comprising:
encoding the input prompt to obtain a prompt encoding;
comparing the prompt encoding to a font encoding; and
selecting a font corresponding to the font encoding based on the comparison, wherein the custom graphic design document comprises a text element with the selected font.

15. An apparatus comprising:
at least one processor;
at least one memory storing instructions executable by the at least one processor;
an image generation model comprising parameters stored in the at least one memory and trained to generate a synthetic image based on an input prompt, wherein the input prompt indicates a target theme; and
a document generation component configured to generate a custom graphic design document based on the synthetic image and an input graphic design document, wherein the custom graphic design document has the target theme and includes the synthetic image at a location of an image element of the input graphic design document.

16. The apparatus of claim 15, further comprising:
a language generation model configured to generate an image generation prompt based on the input prompt, wherein the synthetic image is generated based on the image generation prompt.

17. The apparatus of claim 15, further comprising:
a palette generation model trained to generate a color palette based on the input prompt, wherein the custom graphic design document includes a color from the color palette.

18. The apparatus of claim 15, further comprising:
an icon selection component configured to obtain an icon based on the input prompt, wherein the custom graphic design document includes the icon.

19. The apparatus of claim 15, further comprising:
a text style component configured to select a text style for a text element of the input graphic design document based on the input prompt, wherein the custom graphic design document includes the text element with the text style.

20. The apparatus of claim 15, further comprising:
a background removal component configured to remove a background from the synthetic image.

* * * * *